Patented July 19, 1927.

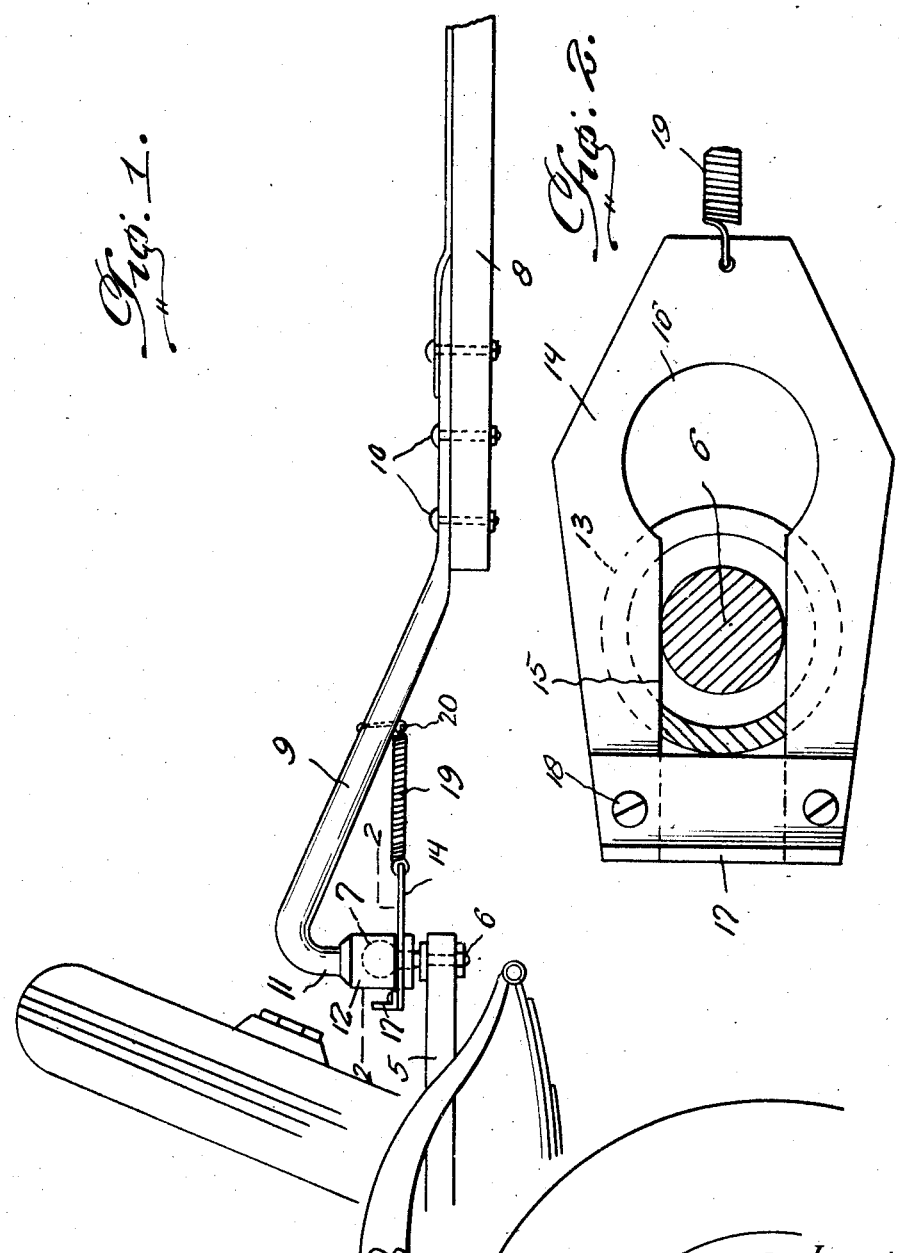

1,636,295

UNITED STATES PATENT OFFICE.

THOMAS DEMPSEY, OF PROCTOR, MINNESOTA; FRED C. MITCHELL EXECUTOR OF SAID THOMAS DEMPSEY, DECEASED.

TRAILER COUPLER.

Application filed May 3, 1926. Serial No. 106,451.

The present invention relates to a coupling device for use particularly in attaching a trailer to an automobile. The coupler structure, however, is by no means limited to this particular use, but is generally adaptable.

The principal object of the invention is to provide a trailer coupler of this nature which will permit free motion, both sideways and up and down, and which removes the strain on the weakest part of the coupling, that is, the point where the coupling is attached to the trailer proper.

Another very important feature of this invention is in the novel locking mechanism used for holding the coupling contrivance together, so that it is, in a coupled condition. This feature lends to the device advantages of ease of assembly and disassembly besides the ease of manipulation.

A still further very important object of the invention resides in the provision of a coupler of this nature with an exceedingly simple construction, which is very compact and convenient in its arrangement and assemblage of parts, one which is thoroughly efficient and reliable in operation, one which is inexpensive to manufacture, not likely to easily become out of order, and one which overcomes the many common disadvantages to couplers designed for the same purpose now in common use.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the coupling contrivance, showing the same in use, and Fig. 2 is an enlarged detail horizontal section taken substantially on the line 2—2 of Fig. 1.

Referring to the drawing in detail, it will be seen that the numeral 5 denotes a bar of angle iron or similar construction which is attached in any preferred manner to the vehicle, with which a trailer is to be coupled. A bolt 6 pierces an opening in the rear end of this bar 5 and at its upper end terminates in a ball 7. The numeral 8 designates the pole or tongue of a trailer, and has attached thereto a rod 9 in any preferred manner, such as by a plurality of bolts 10.

In the present instance, this rod 9 inclines upwardly and forwardly and terminates in a vertical depending extension 11. On the terminal of this extension 11, there is formed a cylindrical socket 12 which is provided with a pair of diametrically opposed sides of the slots 13. The ball 7 is adapted to be loosely received in the socket 12. A plate 14 is provided with an elongated longitudinally extending slot 15, starting at one end and terminating rearwardly at a distance from the rear end of the plate in an enlarged opening 16, the diameter of which is slightly greater than the diameter of the ball 7 so that the ball 7 may be passed therethrough.

The portions of the plate 14 to each side of the slot 15 are slidably mounted in the slot 13 of the socket 12. The forward end of the slots 15 is closed by an angle iron stop 17 held in place by screws 18. Thus by moving this stop 17, the plate may be engaged or disengaged in relation to the socket 12. The major portion of the slot 15 has a diameter substantially equal to the diameter of the bolt immediately below the head 7. A spring 19 has one end attached as at 20 to an intermediate portion of the rod 9. The other end thereof is attached to the rear end of the plate 14, and this spring normally holds the plate as illustrated in Fig. 2, that is in such a position that the shank of the ball 7 is disposed in the narrow portion of the slot 15 so as to prevent the dislodgment of the ball from the socket.

It will readily be seen that by grasping the angle iron stop 17, the plate may be moved forwardly to register the enlarged opening 16 with the interior of the socket so that the socket may be easily lifted off of the ball.

This ball and socket connection gives the motion either sideways or up and down, and thus prevents the binding and strain at the weakest part of the coupling, which is where the coupling is attached to the trailer proper. The structure is exceedingly simple and may obviously be manufactured at a very low cost, but nevertheless will prove thoroughly reliable and efficient in use, and has the great advantage of being easy to assemble or disassemble. The parts are compactly and conveniently arranged besides being attractive in appearance.

The present embodiment of the invention has been disclosed in detail merely by way of example, since in actual practice it attains the features of advantage enumerated as desirable in the statement of the invention and the above description. It will be apparent, that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. A trailer coupler of the class described including a ball, a rod adapted to be attached to a trailer pole, a socket on the rod for receiving the ball, means for attaching the ball to a vehicle, said socket provided with a slot, a lock plate including an elongated slot and having portions slidable in the slot of the socket, a portion of said lock plate slot being narrower than the diameter of the ball and a portion being larger than the diameter of the ball to permit the passage of the ball therethrough, a spring for holding said plate in a position to prevent the accidental removal of the ball from the socket.

2. A trailer coupler of the class described including, in combination, a rod, means for attaching one end of the rod to a coupler pole so that the rod inclines upwardly and forwardly therefrom, the upper end of said rod terminating in a depending extension having one terminal thereof a cylindrical pocket provided in its side walls with a slot, a shank, a ball on the shank, means for attaching the shank to a vehicle, a U-shaped plate having its sides slidable in the slot, and the opening at its bight portion larger to allow the passage of the ball, and a spring attached to said plate for holding it in a position to prevent the accidental displacement of the ball.

3. A trailer coupler of the class described including, in combination, a rod, means for attaching one end of the rod to a coupler pole so that the rod inclines upwardly and forwardly therefrom, the upper end of said rod terminating in a depending extension forming a cylindrical pocket provided in its side walls with a slot, a shank, a ball on the shank, means for attaching the shank to a vehicle, a U-shaped plate having its sides slidable in the slot, and the opening at its bight portion larger to allow the passage of the ball, a spring attached to said plate for holding it in a position to prevent the accidental displacement of the ball, an angle iron stop detachably fixed to the extremities of the U-shaped plate.

In testimony whereof I affix my signature.

THOMAS DEMPSEY.